(12) United States Patent
Marks

(10) Patent No.: US 10,348,940 B2
(45) Date of Patent: Jul. 9, 2019

(54) COMPRESSED VIDEO CAMERA WITH A MOVING PATTERNED DISK

(71) Applicant: National Security Technologies, LLC, North Las Vegas, NV (US)

(72) Inventor: Daniel Marks, Los Alamos, NM (US)

(73) Assignee: Mission Support and Test Services, LLC, Las Vegas, NV (US)

(*) Notice: Subject to any disclaimer, the term of this patent is extended or adjusted under 35 U.S.C. 154(b) by 0 days.

(21) Appl. No.: 15/666,984

(22) Filed: Aug. 2, 2017

(65) Prior Publication Data

US 2018/0041665 A1 Feb. 8, 2018

Related U.S. Application Data

(60) Provisional application No. 62/370,132, filed on Aug. 2, 2016.

(51) Int. Cl.

| H04N 5/225 | (2006.01) |
|---|---|
| H04N 5/12 | (2006.01) |
| H04N 5/235 | (2006.01) |
| H04N 5/232 | (2006.01) |
| H04N 5/238 | (2006.01) |
| H04N 5/33 | (2006.01) |
| H04N 5/32 | (2006.01) |

(52) U.S. Cl.
CPC .......... H04N 5/123 (2013.01); H04N 5/2254 (2013.01); H04N 5/238 (2013.01); H04N 5/2353 (2013.01); H04N 5/23232 (2013.01); H04N 5/32 (2013.01); H04N 5/33 (2013.01)

(58) Field of Classification Search
CPC .................................................... H04N 5/123
USPC ......................................................... 348/368
See application file for complete search history.

(56) References Cited

U.S. PATENT DOCUMENTS

| 2006/0157640 | A1* | 7/2006 | Perlman | ............... | H04N 5/2254 |
| | | | | | 250/208.1 |
| 2010/0253941 | A1* | 10/2010 | Brady | ....................... | G01J 3/02 |
| | | | | | 356/310 |
| 2017/0343635 | A1* | 11/2017 | Salerno | .............. | G01R 33/5601 |

OTHER PUBLICATIONS

Jose M. Bioucas-Dias and Mario A. T. Figureredo, A New Twist: Two-Step Iterative Shrinkage/Thresholding Algorithms for Image Restoration, Nov. 19, 2007, 12 pages.

* cited by examiner

Primary Examiner — Joel W Fosselman
(74) Attorney, Agent, or Firm — Weide & Miller, Ltd.

(57) ABSTRACT

A high-speed video system is disclosed that includes a moving image absorbing disk at an image plane. The disk has a pattern that passes and blocks image data. The disk is located between an event and an image sensor, or reflects an image to the image sensor. The disk is rotated at a speed that matches the desired reconstructed image frame rate. The image sensor frame data is processed using image reconstruction techniques, such as the D-AMP or TWIST algorithm, to recover a time sequence of reconstructed images. Additional images can be reconstructed for each image sensor frame if some spatial resolution is sacrificed. For continuous video, the disk speed is adjusted to the sensor frame rate. For burst mode, a single sensor image is acquired and a short image sequence is reconstructed. This image capture system works with a variety of radiations, including infrared, light, UV and X-rays.

19 Claims, 12 Drawing Sheets

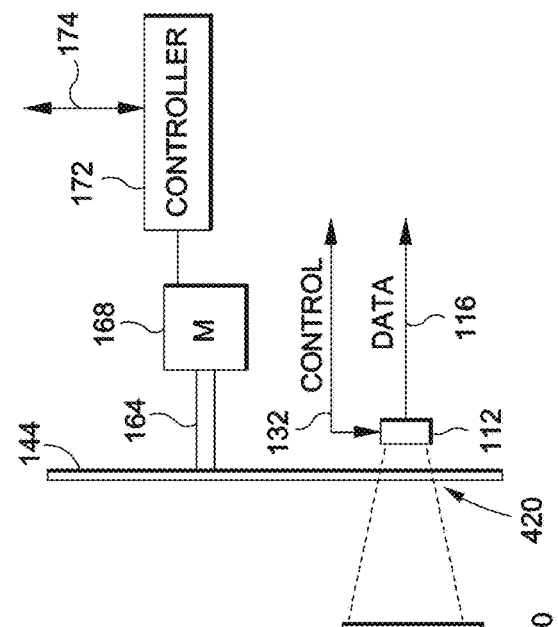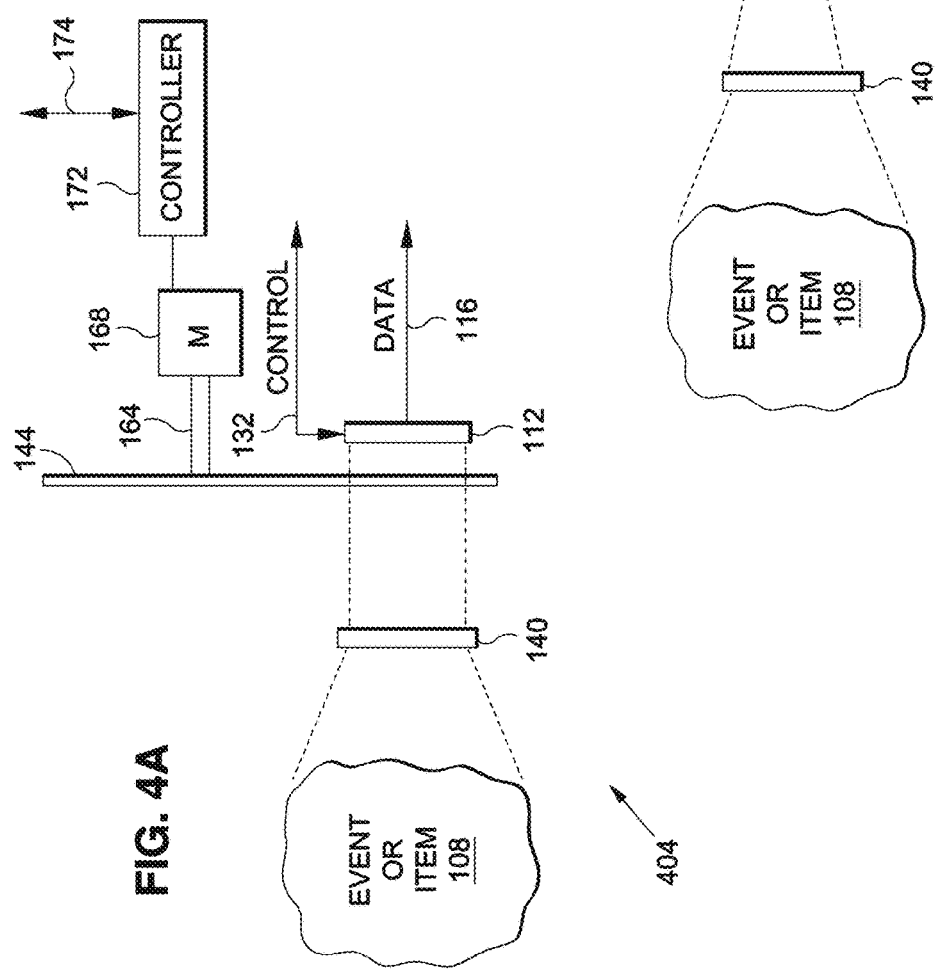

COMPRESSED VIDEO CAMERA WITH A MOVING PATTERNED DISK

PRIORITY CLAIM

This application claims priority to and the benefit of U.S. Provisional Application No. 62/370,132 filed on Aug. 2, 2016, the contents of which are incorporated by reference in its entirety herein.

STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

FIELD OF THE INVENTION

The invention relates to high speed image capture and in particular to a moving patterned surface through which the image passes prior to image recordation.

RELATED ART

In many applications, high speed image capture is required to accurately record, verify, and/or characterize an event. The event may be any event for which high speed image recordation is required. Typical cameras such as professional level or consumer grade cameras are not able to capture images at a sufficiently high frame rate to capture and characterize the event.

In the past, high speed camera systems were used to capture one or more images, at high speed, of events. One such camera system is available from Kirana brand camera from Specialized Imaging Ltd, located in Pitstone, United Kingdom. While this brand and type of camera is able to achieve high speed imagery, it suffers from the drawback of being expensive for many applications and users. For example, cameras with capabilities of the Kirana camera costs over $100,000.

Furthermore, some events are destructive in nature and due to the nature of the event would destroy the camera. As can be appreciated, for very expensive cameras, it is unwanted to destroy the camera during the event.

A further drawback to certain high speed camera designs is that the captured images are not characterized in time or in relation to each sequential image. Stated another way, image data is recorded, but it is not related to time or to other images in the sequence.

Therefore a need exists in the art for an efficient, cost effective system and method for capturing images of high speed events.

SUMMARY

A high-speed video system is constructed by placing a moving absorbing disk at an image plane, with the disk having a complex or random pattern. The disks are rotated at a high speed that matches the desired frame rate. The images acquired by the camera can be processed using a variety of image reconstruction techniques, such as the TWIST algorithm, to recover a time sequence of images from each frame acquired by an image sensor. More images can be reconstructed for each image acquired by the image sensor if some spatial resolution is sacrificed. For continuous video, the disk speed must be adjusted to the sensor frame rate. For burst mode, a single sensor image is acquired and a short image sequence is reconstructed from that one acquired image. This technology will work with a variety of radiations, including infrared, light, UV and x-rays.

An innovative design is described for high-speed imaging using a spinning disk to mechanically structure the illumination hitting an imaging sensor. The great simplicity of the design makes it very cheap to construct. The fact that high speed is not needed in the imaging sensor mean that cheaper sensors can be used and the sensor can be optimized for other factors than speed, such as low noise and high spatial resolution. This technique may enable high speed imaging not achievable with any other means. It can apply to a wide range of radiations, including IR, visible light, UV, x-rays and possibly gamma-rays and neutrons. Its lack of complex electronics, other than possibly the imaging sensor, means it could be used in disposable applications and would be very robust in high radiation environments.

To overcome the drawbacks of the prior art and to provide additional benefits, disclosed is an image capture system configured to capture one or more event images of an event. In one embodiment, the system comprises an image sensor configured to receive and record one or more event images of the event and a processing system configured to process the one or more event images to create reconstructed image frames. Also part of this system is a patterned substrate configured to be moved between the image sensor and the event to selectively block and pass portions of the one or more event images to the image sensor during the event. A motor is configured to move the patterned substrate in relation to a position of the image sensor, the event, or both during the event and a linkage between the motor and the patterned substrate transfers motion of a motor element to the patterned substrate.

In one embodiment, the image sensor records the image as digital image data. It is contemplated that the movement of the patterned substrates consists of rotation of a disk and the linkage comprises a shaft connected to the center of the disk to impart rotational motion to the patterned disk. In one variation, the patterned substrates comprises a pattern of image passing and image blocking elements which passes a portion of the event image and blocks a portion of the event image at any given time or position of the patterned substrates.

In another variation, the system may further comprise a controller configured to synchronize a position for the patterned substrate and operation of the image system. This system may further comprise one or more lenses configured to focus the event on the patterned substrate, the image sensor, or both. The one or more event images may be recorded as image data and the processing system is configured to perform data processing on the image data using one or more of the following algorithms: IST, TWIST, or D-AMP.

Also disclosed is an image capture system configured to capture one or more event images of an event such that the system includes an image sensor configured to receive and record one or more event images of the event as an image sensor frame, and a processing system configured to process the one or more event images to create reconstructed image frames. The number of reconstructed image frames is greater than the number of image sensor frames. Also part of this embodiment is a patterned substrate having image blocking portions and image passing portions. The patterned substrate is configured to be moved between the image sensor and the event to selectively block and pass portions of the event image to the image sensor during the image sensor event.

In one embodiment, the one or more event images are recorded as image data and the processing system is configured to perform data processing on the image data using one or more of the following algorithms, IST, TWIST, or D-AMP, to create the reconstructed image frames. In one configuration, the patterned substrate is a disk connected to a shaft such that the disk and shaft are driven by a motor to rotate around an axis aligned with the shaft. This embodiment may further comprise a controller configured to synchronize a position on the patterned substrate and operation of the image system.

In one variation, the system further comprising one or more lenses configured to focus the event on the patterned substrate, the image sensor, or both. The patterned substrate may be configured to reflect the event image from the event to the image sensor and the image blocking portions absorb the image and the image passing portions reflect the image to the image sensor. The system may further include a second moving patterned substrate aligned between the event and the image sensor. The second moving patterned substrate cooperates with the patterned substrate to selectively block and pass the event image to the image sensor.

Also disclosed is a method for generating reconstructed image frames that represent a higher frame rate than an image captured by an image sensor during an image sensor frame. In one embodiment, this method comprises providing an image sensor, patterned substrate with blocking portions and passing portions, and an event for performing the method. Then, the method characterizes the patterned substrate with a data processing algorithm. The patterned substrate is placed between the event and the image sensor and moved relative to the image sensor or the event, or both. Then, while moving the patterned substrate, initiating the event and synchronizing image capture by the image sensor with a position of the patterned substrate. During the event, capturing one or more image sensor frames with the image sensor of an event image from the event such that the image sensor frames represented by image data so that the patterned substrate blocks portions and passes portions of the event image to the image sensor. During or after data collection, this method processes the image data with a processing device that includes memory and a processor to execute a data processing algorithm on the image data to create reconstructed image frames.

The moving patterned substrate may be rotating the patterned substrate. In one method of operation, the image sensor or event is moved relative to the patterned substrate instead of the patterned substrate moving. This method of operation may further comprise placing a second patterned substrate between the event and the image. In one embodiment, the data processing algorithm is selected from the following group of data processing algorithms: IST, TWIST, or D-AMP.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4A is a block diagram illustrating an alternative embodiment of image sensor located adjacent a rotating patterned disk.

FIG. 4B is a block diagram illustrating an embodiment of an alternatively sized image sensor located adjacent a rotating patterned disk.

DESCRIPTION OF APPARATUS

Figure 1A:
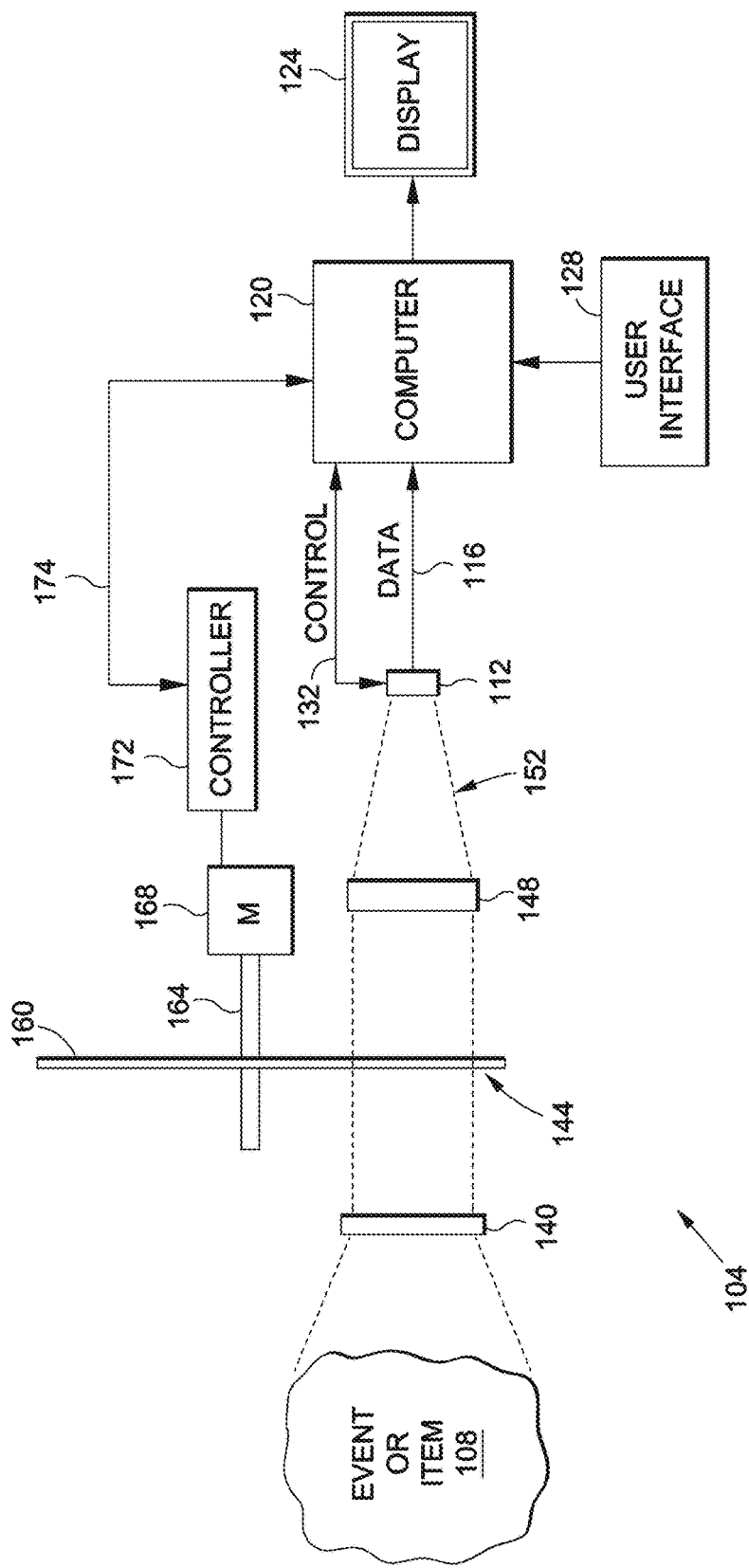
FIG. 1A is a block diagram illustrating an image sensor with patterned rotating disk.

FIG. 1A is a block diagram illustrating a side view of an image sensor with patterned rotating disk. This is but one possible embodiment and it is contemplated that many different arrangements exist that do not depart from the scope of the claims. The imaging system 104 is arranged to capture an image of an event 108. The event 108 may be any type event, either static or dynamic, illuminating or non-illuminating.

Arranged at a distance from the event is an image capture device 112, such as CCD, film, or any device capable of capturing an image or an electrical representation of an image. The image capture device 112 includes image data on output path 116, and also includes a control signal input/output 132 to control one or more aspects of the image capture device 112, such as start and stop of operation, sensitivity, readout rate, or any other parameter.

In this example embodiment, the control path 132 and the data output path 116 connect a computer 120 or any other processing device able to receive and process image data from an image capture device. The computer 120 includes a display 124 and user interface 128, as are known in the art, to allow for interface with a user and display of image data. Other peripheral devices may also connect to the computer 120. The computer 120 may comprise any type computer or processing device now known or developed in the future.

Located between the event 108 and the image capture device are one or more lenses 140, 148 and a rotating disk 144. The first lens 140 is located between the event 108 and the disk 144 to focus the image on the disk. The disk 144 may be made of any material suitable for having opaque or blocked portions on a disk surface 160 or as part of the disk, which block the image from passing through the disk and other portions which are transparent or open to allow the image to pass through from the event 108. The image may be transferred from the event in any form such as infrared, visible, ultraviolet light energy, x-rays, particles, or any other type of energy emitted or reflected from the event. The disk 144 is described below in greater detail.

The disk 144 is centrally mounted on a shaft 164. The shaft 164 is rotated by a motor 168 to establish rotational motion to the disk 144. In other embodiments, the disk 144 may be rotated through rational force along the outer edge of the disk or any other mechanism for causing movement of the disk. A controller 172 communicates with the motor to establish one or more of the precise disk positions in relation to time, synchronization with the image capture device 112, rotation start and stop functions, and rotation speed. The controller 172 communicates with the computer 120 or directly with the image capture device 112.

Due to the portion and open position of the disk 144 and the sections that are open, only a portion of the image passes through the disk. A second lens 148 focuses or directs the portion of the image that passes through the disk 144 to the image sensor 148. Although shown as a single lens 140, 148, it is contemplated that the lens may comprise lens groups having one or more lens.

Figure 2:
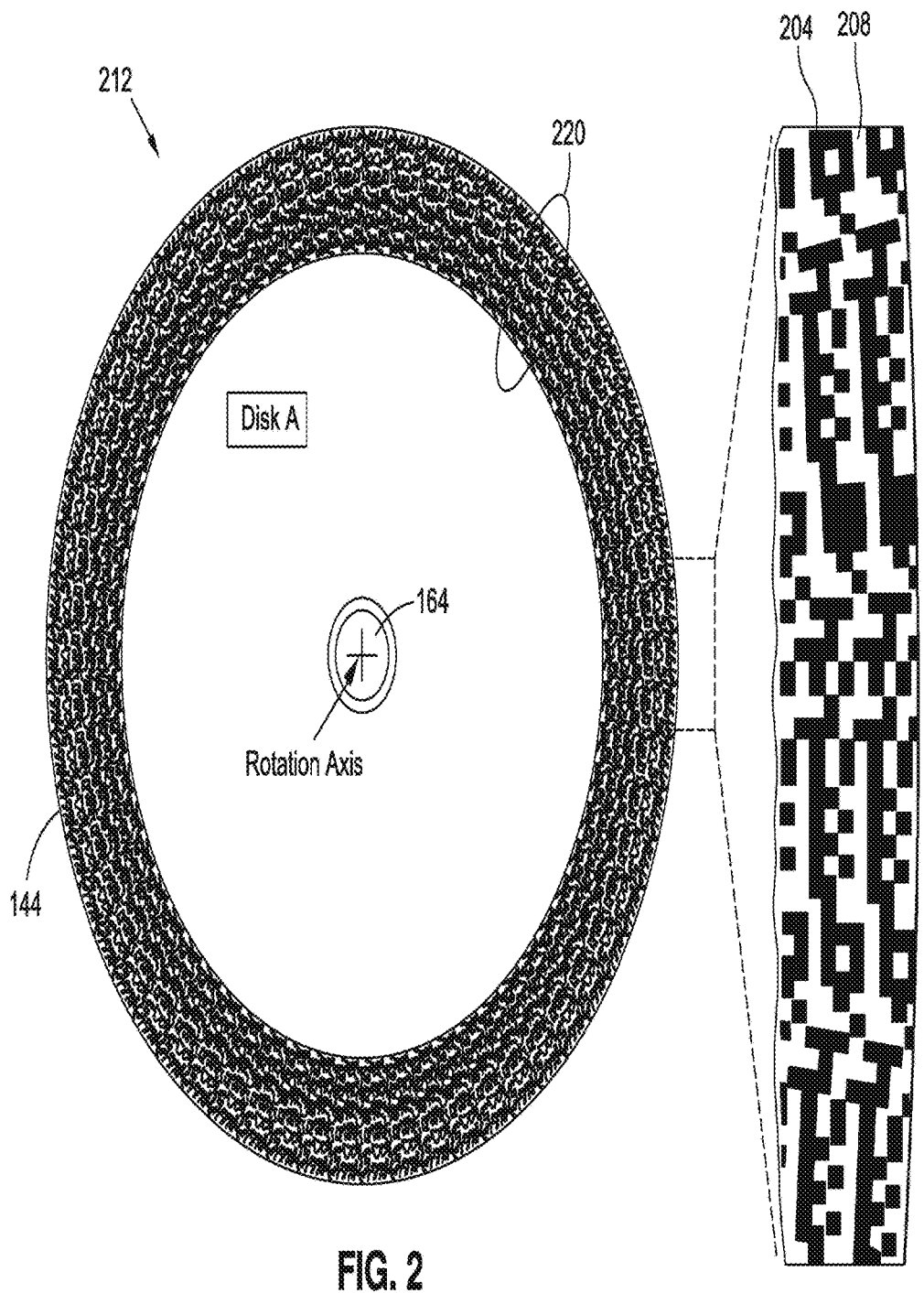
FIG. 2 illustrates a front view of the patterned disk.

As shown in FIG. 2, the disk is given a complex absorption pattern 212 on its outer edge 220. This pattern 212 can either be a material placed on a transparent disk 144 or it can consist of holes in a solid material, which is more suitable for x-ray imaging. Although shown in this embodiment as a disk, the patterned element 144 may comprise any type substrate in any shape such as but not limited to a disk, wheel or planar sheet. The term substrate is used to mean any patterned element which selectively blocks or reflects a portion of the image from the image sensor. The disk 144 is mounted on an axle or shaft 164 and spun at a high rate, which can be accomplished with a variety of mechanical means. The pattern on the disk could consist of very narrow holes in a thick material for high-energy x-rays. The pattern holes can be angled to match a diverging beam. A Digital Micromirror Device can be used to impart a changing pattern instead of a rotating disk.

As discussed above, the disk 144 is positioned at an image plane in front of an image sensor, either at a focused image plane or at an image plane located near the image sensor 112, which, in one example embodiment, is suitable for x-ray pinhole imaging. The image sensor can be an electronic sensor, such as a CDD, a piece of film or an image plate. A method for aligning the disk 144 with the image sensor 112 may or may not be needed since the position of the disk can be deduced from the data acquired by the image sensor. The pattern 220 on the disk 144 can assume a number of different patterns, including random squares, random cylindrical sections, or specialized patterns suitable for specific imaging applications. Fiducials can be included on the edge of the imaging area (not shown in the figures), but these will generally not be necessary since the position of the disk 144 during imaging can be deduced from the data.

The pattern 220 on the disk 144 can be a random binary absorbing patter (FIG. 1) or a special pattern suitable to a specific imaging application. This could be a square pattern, a cylindrical pattern or any number of other patterns. Generally, the pattern would absorb half the light, but this is not essential for the technology as in other embodiment other ratios of absorbing (blocking) 204 to non-absorbing (non-blocking) 208 sections are possible and contemplated. The pattern 220 can repeat at fixed intervals or change continually around the disk. The disk is mounted at an image plane, either an intermediate one or near the image sensor, and rotated. Additional details regarding the method of use and operation are described below in connection with FIG. 6.

Figure 1B:
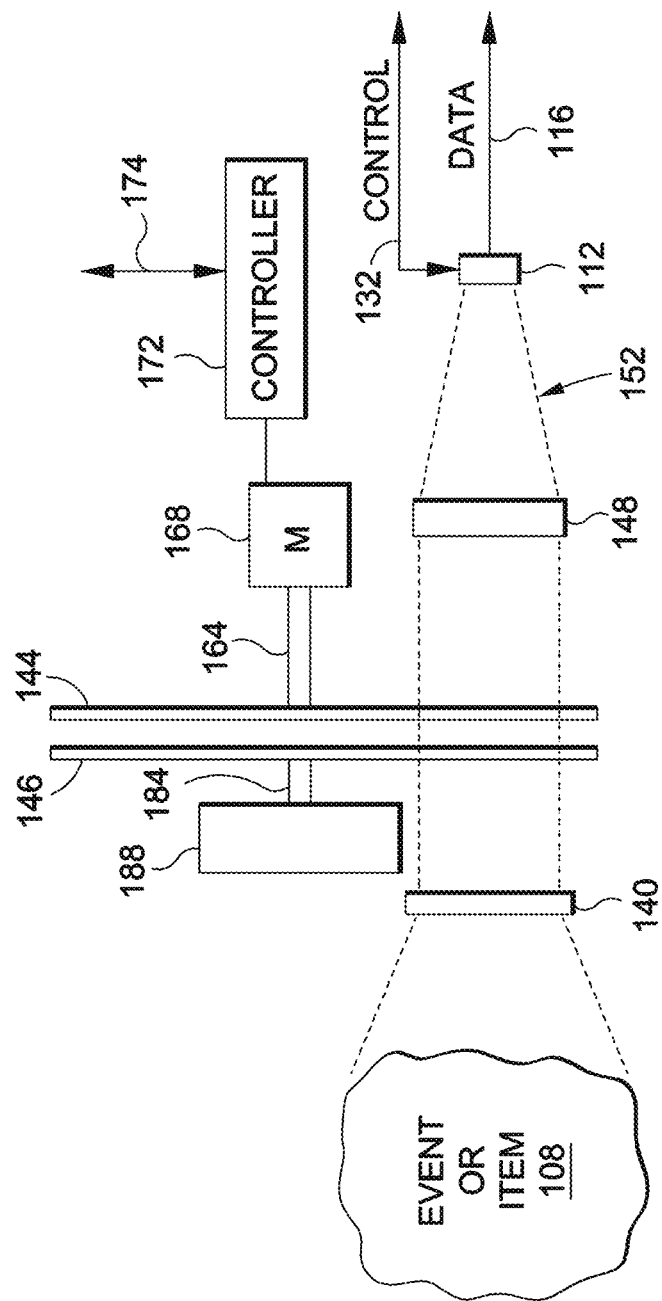
FIG. 1B is a block diagram illustrating an image sensor with two patterned rotating disks.

FIG. 1B is a block diagram illustrating an image sensor with two patterned rotating disks. The embodiment of FIG. 1B is generally similar to the embodiment of FIG. 1A and as such, only the aspects of FIG. 1B that differ from FIG. 1A are described in detail. In this embodiment, a second rotating or non-rotating disk 146 is provided between the event 108 and the image sensor 112. The second disk 146 connects to a shaft or axis 184, which in turn is rotated by a motor 188. The second disk 146 may stay stationary or rotate. Rotation may be in the same direction as or counter to the first disk 144. The second disk is likewise patterned in some manner to establish openings and closed portions, such as for example shown in FIG. 2. The two disks establish a more complex pattern and with two counter rotating disks the effective speed of rotation, as viewed from the event 108 to the image sensor 112 is increased or decreased, or more complex patterns may be established. This may make the pattern change faster than the disk speed through interference between the two disk patterns. Although not shown in FIG. 1B, it is contemplated that a computer 120, display 124, and user interface 128 is also provided.

Figure 3:
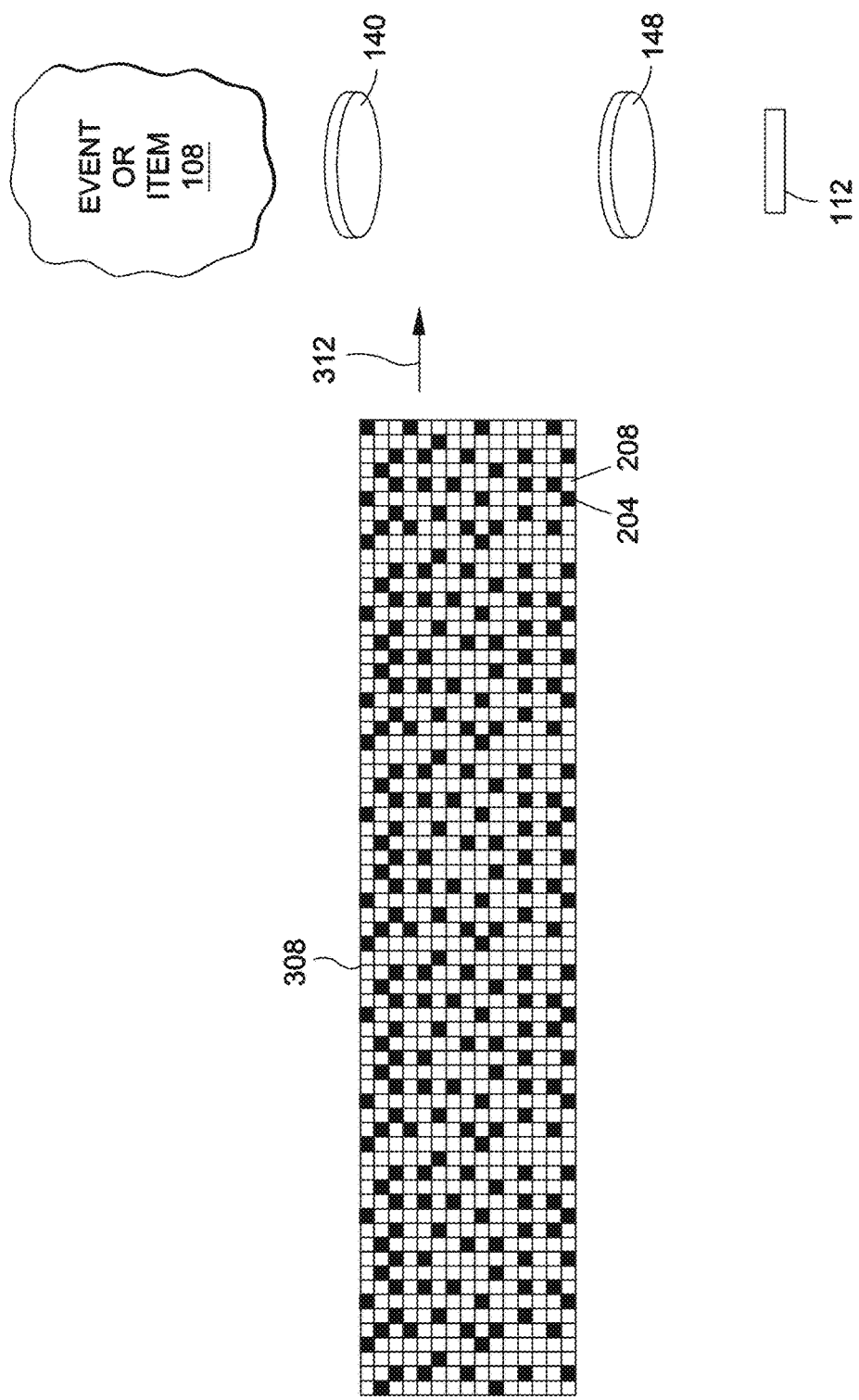
FIG. 3 is block diagram of a camera with linearly moving patterned sheet.

FIG. 3 is block diagram of a camera with linearly moving patterned sheet. Instead of rotating disk as shown in FIG. 1A, any other type or shape of substrate may be used to selectively pass portions of the image from the event to the image sensor 112. In this embodiment, a planar sheet 308 is patterned with openings 208 and closed portions 204. The planar sheet 308 moves in a direction 312 shown the by arrow that establishes the sheet between the event 108 and the image sensor 112. The patterns of opened sections 208 and closed sections 204 on the sheet block a portion of the image from reaching the sensor 112. One or more optional lenses 140, 148 are provided to selectively focus the image on the planar sheet 308 and the image sensor 112. One or more rails, guides, grooves, or any other mechanism may guide or connect to the sheet to secure its motion 312 between the event 108 and the image sensor 112. Other configurations or shapes of the sheet are contemplated. For example, the patterned substrate may be a hollow cylinder shape, planar sheet, disk, shutter or any other shape.

FIG. 4A is a block diagram illustrating an alternative embodiment of image sensor located adjacent a rotating patterned disk. The embodiment of FIG. 4A is generally similar to the embodiment of FIG. 1A and as such, only the aspects of FIG. 4A that differ from FIG. 1A are described in detail. In this example embodiment, the image sensor 112 is placed directly near the rotating disk 144 thereby avoiding use of the second lens 148 and also reducing the size of the system 404. The lens 140 could also be a pinhole for imaging x-rays or particles. Thus, the lens 140 focuses an image of the event 108 onto the disk 144 and the image sensor 112 and the close proximity of the image sensor to the disk provides for focus on both the image sensor and the disk and through the back side 160 of the disk.

FIG. 4B is a block diagram illustrating an embodiment of an alternatively sized image sensor located adjacent a rotating patterned disk. The embodiment of FIG. 4A is generally similar to the embodiment of FIG. 4A and as such, only the aspects of FIG. 4B that differ from FIG. 4A are described in detail. In this example embodiment, the image sensor 112 is placed directly near the rotating disk 144 thereby avoiding use of the second lens 148 and also reducing the size of the system 404. In addition, the image sensor 112 is smaller and the lens 140 focuses the image to a smaller area 420 to accommodate smaller image sensor sizes. Thus, the lens 140 focuses an image of the event 140 onto the disk 144 or the image sensor 112 and the proximity of the image sensor to the disk provides for focus on both the image sensor and the disk and through the back side 160 of the disk.

Figure 5:
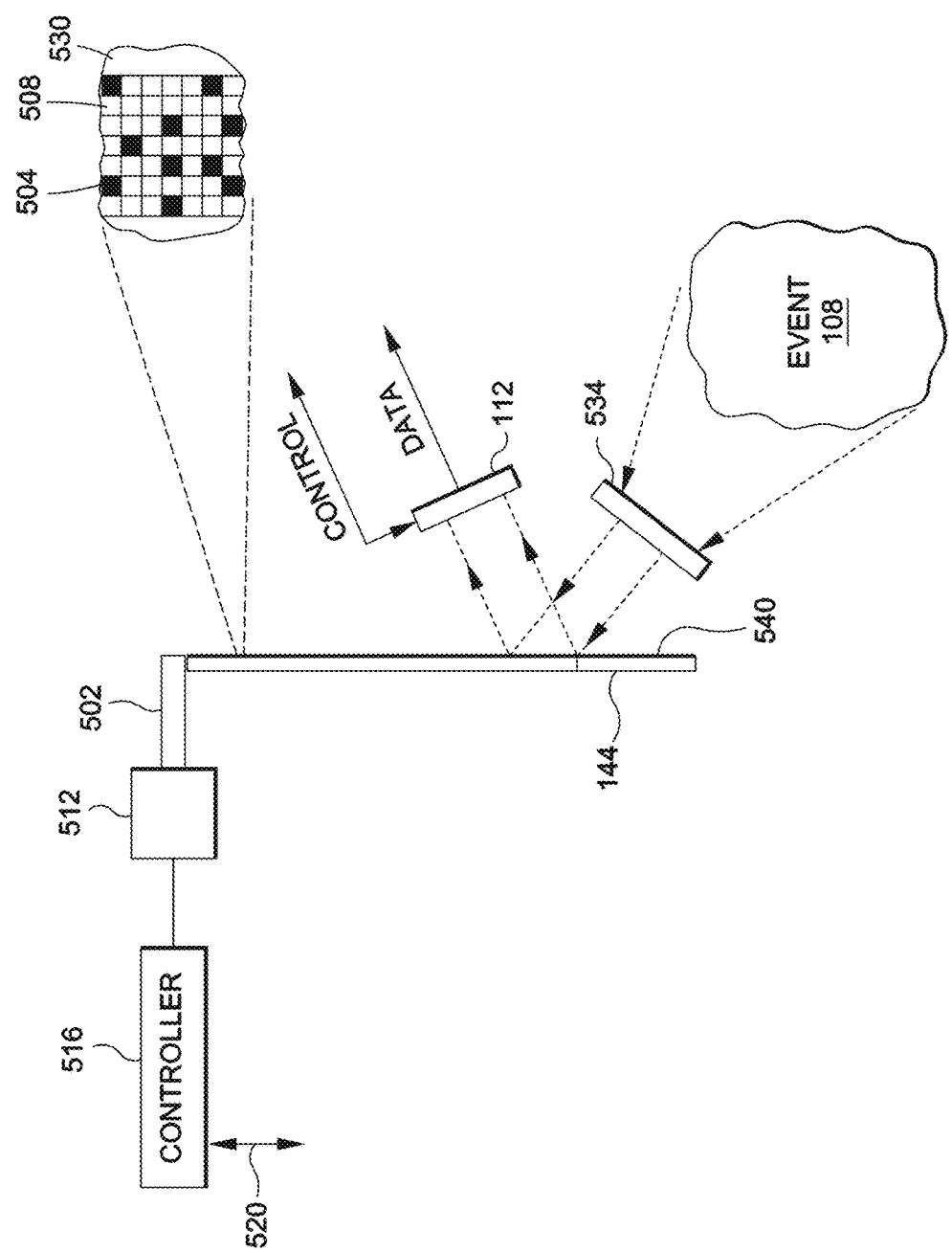
FIG. 5 is a block diagram illustrating an image sensor located in relation to a mirrored rotating patterned disk.

FIG. 5 is a block diagram illustrating an image sensor located in relation to a mirrored rotating patterned disk. In this embodiment, the disk 144 is rotated about a shaft or drive mechanism 502. The shaft 502 is driven by a motor 512 or other movement imparting device. The motor 512 is controlled and powered by a controller 516, which has an input/output port 520 to provide input to the controller.

In this embodiment, the disk 144 has a mirror and absorbing pattern 530 on a surface 540. The surface 540 includes reflective portions 508 and non-reflective portions 504 which selectively reflect or absorb the image from the event 108. A lens 534 is optional and placed between the event 108 and the disk 144 (as shown) or between the disk 144 and the image sensor 112.

In operation of this embodiment, the image of the event 108 is selectively reflected off the rotating disk 144 based on the pattern or reflective and non-reflective areas 530 that are on all or a portion of the disk. The reflected image is captured by the image sensor 112. The portion of the image that is reflected and captured changes over time.

Numerous different methods of operation are contemplated. The following provides a general discussion of operation followed by a method of operation discussed in connection with FIG. 6.

Prior to using the system for collecting image sequences, the pattern on the disk must be characterized. This can be done in the manufacturing process if exact tolerances are used, but most likely calibration of the pattern will need to be done, such as for example with the image sensor and an event or the image sensor and a light source or other energy source used for calibration and characterization. Multiple images of a flat field source can be taken at regular intervals with the disk stationary, dynamically rotating, or rotated to different positions so that the entire area viewed by the image sensor is recorded. This data will be saved and used in the image sequence reconstruction process and as part of the image processing algorithms discussed below.

The imaging operation may occur in continuous video mode or burst mode. When using the apparatus for imaging, the operation will depend on whether it is operated in continuous video mode or in burst mode. In continuous video mode, the disk is rotated at a rate such that the number of disk elements passing a given point during the image sensor recording time is equal to the desired number of reconstructed frames per recorded frame. Thus, if it is desired to create 16 reconstructed frames (algorithm output), then during a recorded image sensor frame (by the image sensor) the disk would be rotated through 16 positions during the image sensor frame. For purposes of discussion, the term image sensor frame is defined to mean one frame or image recordation period by the image sensor. The term reconstructed frame is defined to mean a frame that is created by an image processing algorithm based on the energy passing through the disk, during disk rotation, during an image sensor frame. Thus, in one example embodiment, if the image sensor frame is one second duration, and the disk moves through 16 discrete positions during the one second image sensor frame, then the algorithm will output 16 reconstructed frames.

The more frames that are reconstructed, the worse the spatial resolution of the reconstructions will be, but each reconstructed frame will capture image data at a higher effective frame rate than the image sensor frame rate. Calibration of the disk position can be accomplished either through exact mechanical control, fiducials placed at the edge of the image or through analysis of the acquired image data.

In one example embodiment of burst mode operation, it is preferred to limit the length of the signal (representing the image) to be recorded. This can be accomplished either through the duration control of the illuminating pulse or through another gating mechanism, such as a micro-channel plate, or any other mechanism or method for gating. The image sensor records a single image which will be used to reconstruct the full burst sequence. The image sensor can either have an indefinite frame time, such as with film or an image plate, or can have a finite frame time. If a finite frame time is used, the sensor must be synchronized with the illumination so that the full data set is recorded on a single image. As with continuous mode, the speed of the disk is preferably matched to the desired number of frames. Calibration can also be accomplished by the same means listed for continuous mode.

Reconstruction of the image sequence can be accomplished through a variety of different reconstruction techniques. Generally, reiterative approaches will be made as to the true image sequence until one is found that agrees well with the data. This can be done through several different search algorithms and/or image processing algorithms such as conjugate gradient and steepest descent, or through simpler iterative algorithms such as IST, TWIST, or D-AMP. These image processing (data) algorithms are generally known in the art and thus not discussed in detail herein. A variety of constraints can be put on the data to reduce noise, including Total Variation and Maximum Entropy. Reconstruction can proceed either on a pixel-by-pixel basis or else the full image sequence can be reconstructed together. The following paper provides a discussion on the TWIST algorithm: *A New TwIST: Two-Step Iterative Shrinkage/Thresholding Algorithms for Image Restoration* written by Jose M. Bioucas-Dias and Mario A. T. Figueiredo published in *IEEE Transactions on Image Processing* at Volume: 16, Issue: 12 Dec. 2007.

Figure 6:
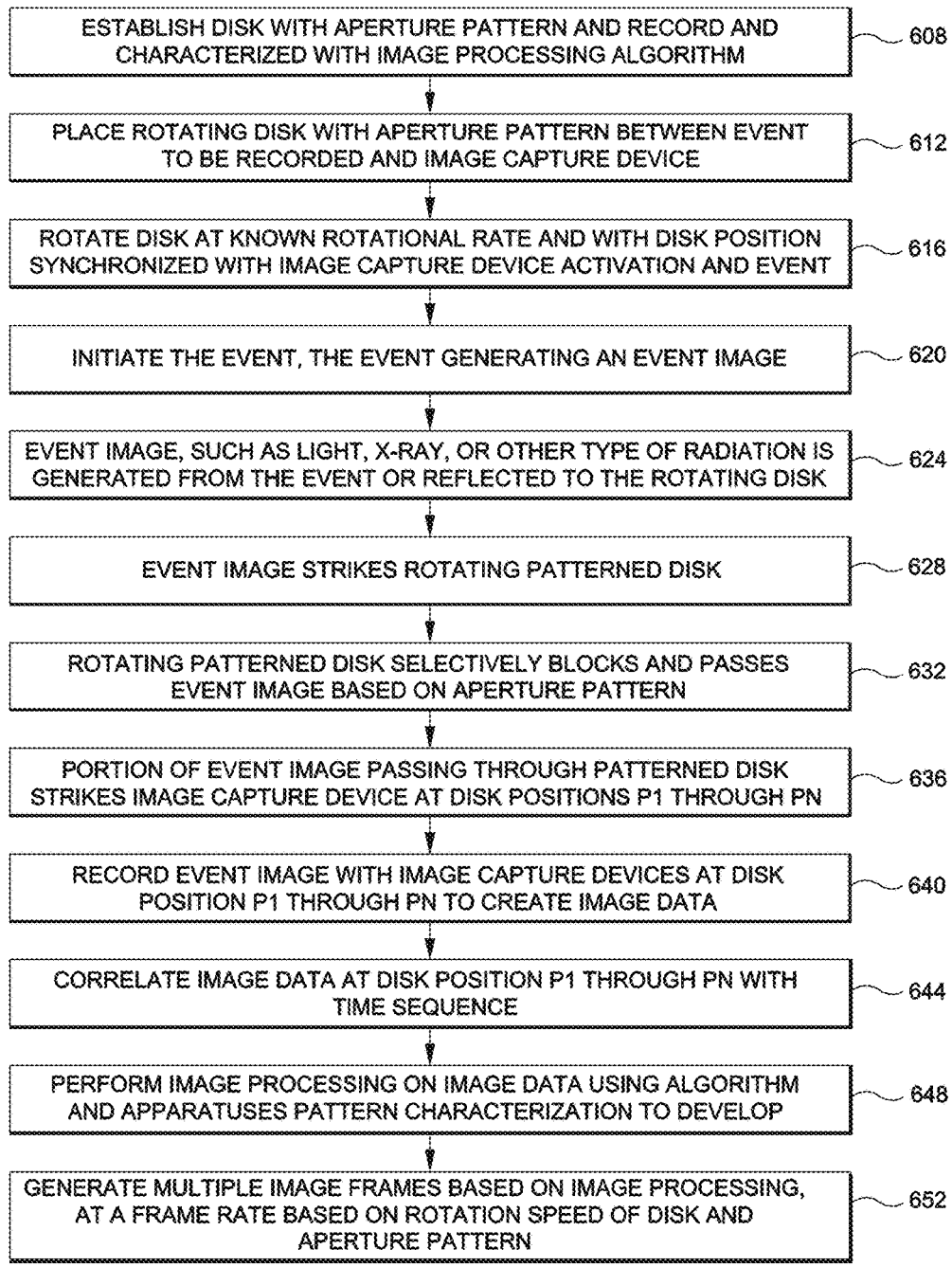
FIG. 6 illustrates an operational flow diagram of an example method of operation associated with the embodiment of FIG. 1.

FIG. 6 illustrates an operational flow diagram of an example method of operation associated with the embodiment of FIG. 1A. This is but one possible method of operation and other methods of image capture are contemplated without departing from the scope of FIG. 6.

At a step 608, this example method of operation establishes a disk with an aperture pattern and records and characterizes the pattern with an image processing algorithm. The algorithm uses this data obtained during characterization to know the open and blocked pattern of the disk at each disk position during an image sensor frame.

At a step 612, the rotating disk with aperture pattern is placed between an event to be recorded and image capture device. At a step 616, this example method of operation rotates the disk at known rotational rate and with the disk position synchronized with image capture device activation and event. A controller, motor, and image sensor may communicate, such as through a computer or directly, to achieve this synchronization.

At a step 620, the event is initiated or occurs, such that the event generates an event image that is emitted from the event or which is reflected from the event. Different types of events will generate different types of images. The term event image or image energy is defined to mean any type energy emitted from, reflected from, or passing through an event. At a step 624, the event image, such as light, X-rays, or other type of image energy generated from the event or reflected to the rotating disk.

Then, at a step 628 the event image strikes the rotating patterned disk and at a step 632, the rotating patterned disk selectively blocks and passes event image based on aperture pattern (open sections and closed sections) of the patterned disk. Thus, at each disk position a portion of the event image passes through the disk to the image sensor. Thus, at a step 636, a portion of the event image that is passing through the patterned disk strikes image capture device at disk positions P1 through PN, where the variable N is any whole number.

At a step 640, the image sensor (Image Capture Device) records the event image at disk position P1 through PN to create image data. The disk may be moved and stopped or in continual rotational or linear movement. At a step 644, the algorithm correlates image data at disk position P1 through PN with time sequence. This links the disk position to time for image sequencing.

At a step 648 an algorithm performs image processing on image data using the pattern characterization to develop multiple reconstructed images from the image sensor image.

At a step 652 the system generates multiple image frames based on image processing, such that the frame rate based on rotation speed of disk and aperture pattern. A greater number of reconstructed image frames are output from the algorithm than the number of image frames captured by the image sensor. This has the effect of the algorithm output increasing the frame rate, such that the data provided to the algorithm is a direct result of the patterned disk and the rate of rotation of the disk. The pattern rate and the rational speed controls the number of reconstructed image frames.

Figure 7A:
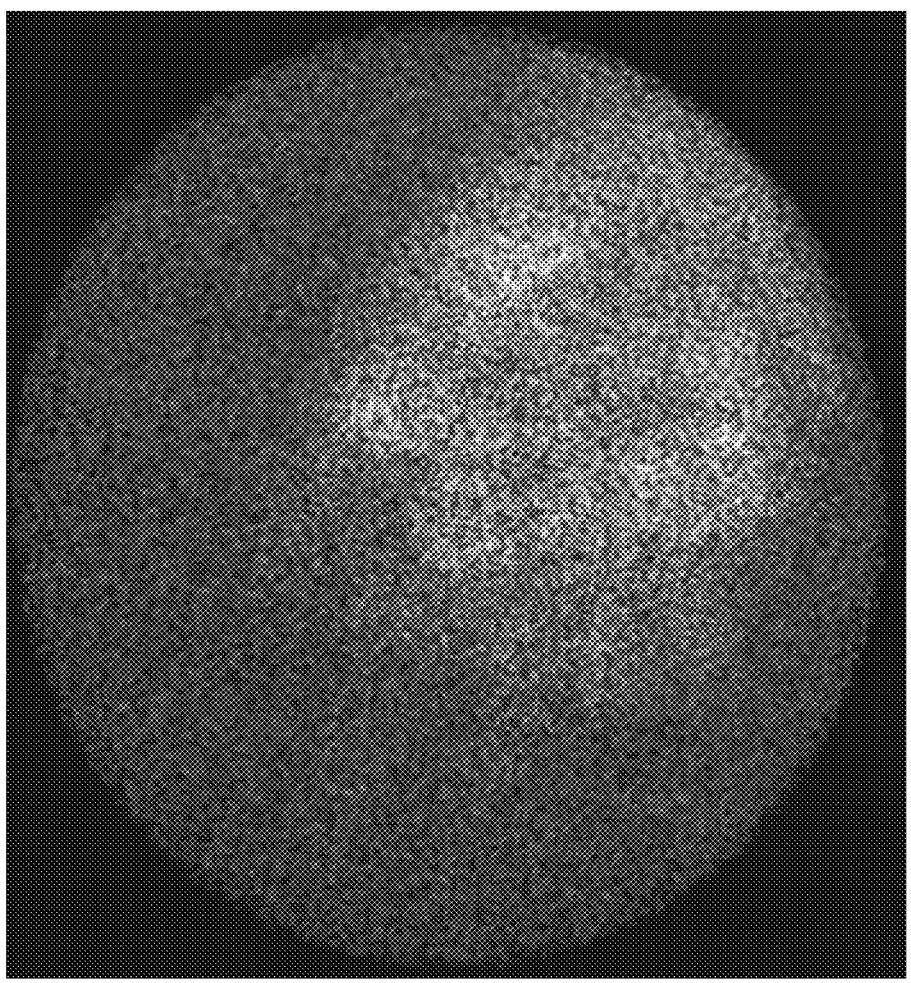
FIG. 7A illustrates an image captured by the image sensor.
Figure 7B:
FIGS. 7B, 7C, 7D and 7E illustrate four of the sixteen images reconstructed from the image in 7A.
Figure 7C:
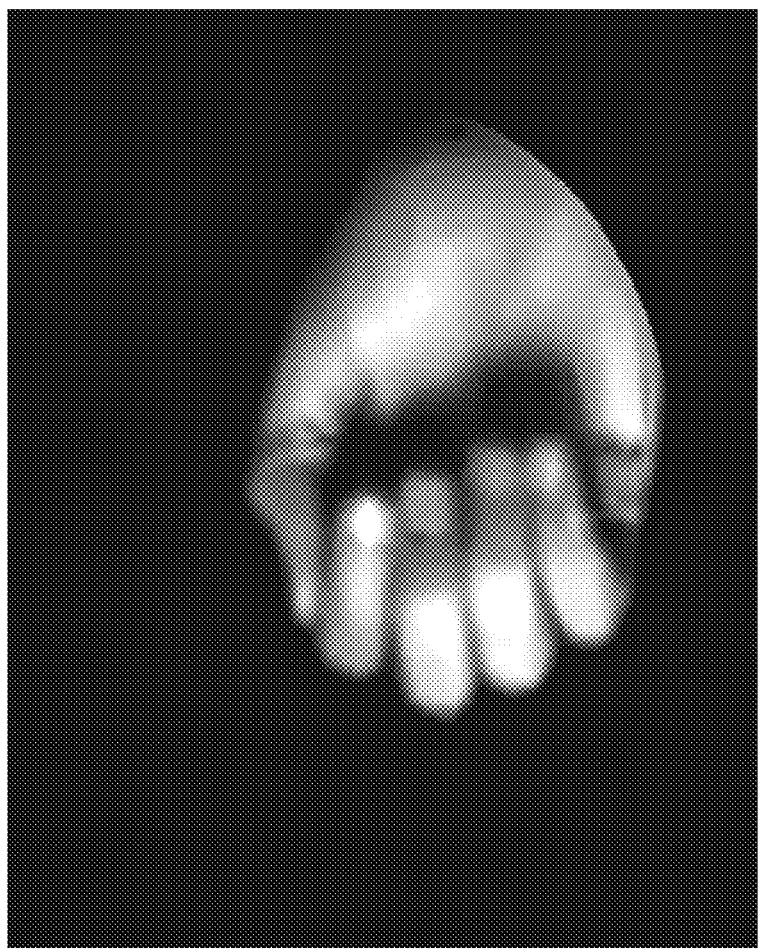
Figure 7D:
Figure 7E:
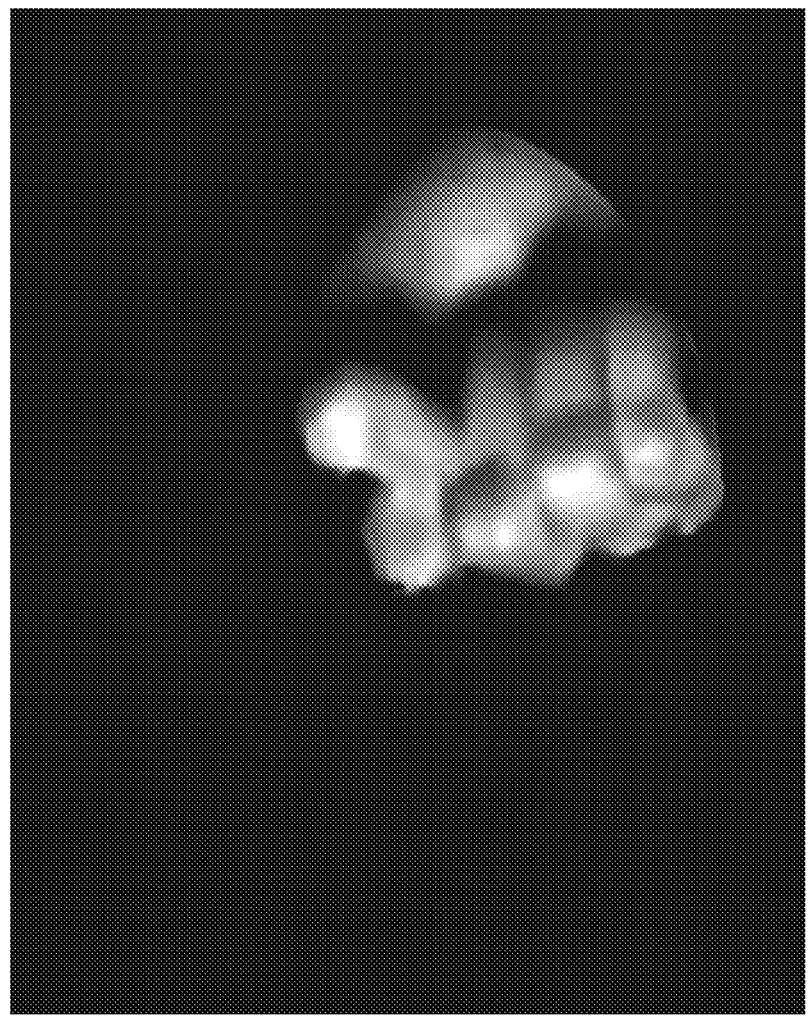

FIG. 7A illustrates an image captured by the image sensor. This is the image captured by the camera after the image passes through the moving disk. In this example embodiment, the period that the camera records the image may be equal to the time for the disk to rotate or otherwise move through 16 unique disk positions, such as 16 unique aperture pattern positions. The camera records the entire image received as the disk rotates and lets of the portion of the event information through to the camera. Using post processing, the images shown in FIGS. 7B, 7C, 7D and 7E obtained. The images in these figures illustrate four of the sixteen images reconstructed from the image in 7A. Thus, for an image frame captured by the camera, 16 individual frames may be derived.

What is claimed is:

1. An image capture system configured to capture one or more event images of an event, the system comprising:
    an image sensor configured to receive and record one or more event images of the event;
    a processing system configured to process the one or more event images to create reconstructed image frames;
    a patterned substrate, located between the image sensor and the event to selectively block and pass portions of the one or more event images to the image sensor during the event;
    a motor configured to move the patterned substrate in relation to a position of the image sensor, the event, or both during the event, wherein movement of the patterned substrates includes rotation and the patterned substrate is a disk; and
    a linkage between the motor and the patterned substrate to transfer motion of a motor element to the patterned substrate.

2. The system of claim 1 wherein the image sensor records the image as digital image data.

3. The system of claim 1 wherein the linkage comprises a shaft connected to the center of the disk to impart rotational motion to the disk.

4. The system of claim 1 wherein the patterned substrate comprises a pattern of image passing and image blocking elements which passes a portion of the event image and blocks a portion of the event image at any given time or at any given position of the patterned substrate.

5. The system of claim 1 further comprising a controller configured to synchronize a position for the patterned substrate and operation of the image system.

6. The system of claim 1 further comprising one or more lenses configured to focus the event on the patterned substrate, the image sensor, or both.

7. The system of claim 1 wherein the one or more event images are recorded as image data and the processing system is configured to perform data processing on the image data using one or more of the following algorithms: IST, TWIST, or D-AMP.

8. An image capture system configured to capture one or more event images of an event, the system comprising:
    an image sensor configured to receive and record one or more event images of the event as an image sensor frame;
    a processing system configured to process the one or more event images to create reconstructed image frames, the number of reconstructed image frames greater than the number of image sensor frames; and
    a patterned substrate having image blocking portions and image passing portions, the patterned substrate configured to be moved between the image sensor and the event to selectively block and pass portions of the event image to the image sensor during the image sensor event, wherein movement of the patterned substrate is rotation of the patterned substrate.

9. The system of claim 8 wherein the one or more event images are recorded as image data and the processing system is configured to perform data processing on the image data using one or more of the following algorithms, IST, TWIST, or D-AMP, to create the reconstructed image frames.

10. The system of claim 8 wherein the patterned substrate is a disk connected to a shaft, the disk and shaft driven by a motor to rotate around an axis aligned with the shaft.

11. The system of claim 8 further comprising a controller configured to synchronize a position for the patterned substrate and operation of the image system.

12. The system of claim 8 further comprising one or more lenses configured to focus the event on the patterned substrate, the image sensor, or both.

13. The system of claim 8 wherein the patterned substrate is configured to reflect the event image from the event to the image sensor and the image blocking portions absorb the image.

14. The system of claim 8 further comprising a second moving patterned substrate aligned between the event and the image sensor, the second moving patterned substrate cooperating with the patterned substrate to selectively block and pass the event image to the image sensor.

15. A method for generating reconstructed image frames that represent a higher frame rate than an image captured by an image sensor during an image sensor frame, the method comprising:
    providing an image sensor, patterned substrate with blocking portions and passing portions, and an event;
    characterizing the patterned substrate with a data processing algorithm;
    placing the patterned substrate between the event and the image sensor;
    moving the patterned substrate relative to the image sensor or the event, or both, wherein moving the patterned substrate comprises rotating the patterned substrate;

while moving the patterned substrate, initiating the event and synchronizing image capture by the image sensor with a position of the patterned substrate;

during the event, capturing one or more image sensor frames with the image sensor of an event image from the event, the image sensor frames represented by image data such that the patterned substrate blocks portions and passes portions of the event image to the image sensor; and processing the image data with a processing device that includes memory and a processor to execute a data processing algorithm on the image data to create reconstructed image frames.

16. The system of claim 15 wherein the image sensor or event is moved relative to the patterned substrate instead of the patterned substrate moving.

17. The system of claim 15 further comprising placing a second patterned substrate between the event and the image.

18. The system of claim 15 wherein the data processing algorithm is selected from the following group of data processing algorithms: IST, TWIST, or D-AMP.

19. The system of claim 15 wherein the patterned substrate is a patterned sheet.

* * * * *